(12) United States Patent
Jung et al.

(10) Patent No.: US 7,629,423 B2
(45) Date of Patent: Dec. 8, 2009

(54) ALKENE-ACRYLATE-NORBORNENE TERPOLYMER AND METHOD FOR PREPARING THE SAME

(75) Inventors: Yoo-young Jung, Daejeon (KR); Byoung-ho Jeon, Daejeon (KR); Bae-kun Shin, Incheon (KR); Ki-soo Lee, Daejeon (KR)

(73) Assignee: LG Chem, Ltd. (KR)

( * ) Notice: Subject to any disclaimer, the term of this patent is extended or adjusted under 35 U.S.C. 154(b) by 144 days.

(21) Appl. No.: 11/741,431

(22) Filed: Apr. 27, 2007

(65) Prior Publication Data

US 2007/0255027 A1    Nov. 1, 2007

(30) Foreign Application Priority Data

Apr. 28, 2006  (KR) ............... 10-2006-0038843

(51) Int. Cl.
| C08F 4/04 | (2006.01) |
| C08F 4/06 | (2006.01) |
| C08F 4/08 | (2006.01) |
| C08F 4/10 | (2006.01) |
| C08F 4/14 | (2006.01) |
| C08F 4/18 | (2006.01) |
| C08F 32/08 | (2006.01) |
| C08F 10/00 | (2006.01) |

(52) U.S. Cl. .................. 526/100; 526/95; 526/107; 526/120; 526/123.1; 526/194; 526/195; 526/219.2; 526/226; 526/227; 526/281; 526/282

(58) Field of Classification Search ............... 526/319, 526/129, 348.2, 348.3, 348.5, 348.6, 100, 526/281–282; 502/300–355
See application file for complete search history.

(56) References Cited

U.S. PATENT DOCUMENTS

| 3,183,217 A | * | 5/1965 | Thomas et al. ............... 526/221 |
| 3,496,217 A |   | 2/1970 | Drinkard et al. |
| 3,496,218 A |   | 2/1970 | Drinkard |
| 3,773,809 A |   | 11/1973 | Walter |
| 4,001,159 A | * | 1/1977 | Imai et al. ............... 524/161 |
| 4,774,353 A |   | 9/1988 | Hall et al. |
| 4,874,884 A |   | 10/1989 | McKinney et al. |
| 5,041,664 A | * | 8/1991 | Su ............... 564/296 |
| 6,127,567 A |   | 10/2000 | Garner et al. |
| 6,171,996 B1 |  | 1/2001 | Garner et al. |
| 6,380,421 B1 |  | 4/2002 | Lu et al. |
| 2003/0060577 A1 | * | 3/2003 | Benicewicz et al. ............ 526/95 |
| 2005/0277569 A1 | * | 12/2005 | Goodall et al. ............... 510/446 |
| 2006/0100403 A1 | * | 5/2006 | Yoon et al. ............... 526/218.1 |

FOREIGN PATENT DOCUMENTS

JP    2004277473 A  * 10/2004

OTHER PUBLICATIONS

CN 1693329 (CAPlus Abstract AN 2006:708050).*

* cited by examiner

*Primary Examiner*—Randy Gulakowski
*Assistant Examiner*—Brieann R Fink
(74) *Attorney, Agent, or Firm*—Cantor Colburn LLP

(57) ABSTRACT

The present invention provides method of preparing alkene-acrylate-norbornene terpolymer by polymerization of a monomer mixture consisting of alkene, acrylate and norbornene by a radical initiator under the presence of a Lewis acid.

In the method of preparing the alkene-acrylate-norbornene terpolymer of the present invention, the terpolymer may be prepared in the mild condition of low temperature and low pressure by using the Lewis acid so that the process is simple and the property of the terpolymer may be easily controlled. In addition, the terpolymer prepared by the method includes the ethylene and the norbornene simultaneously so that it has high glass transition temperature, and the brittle property in forming of film is improved.

22 Claims, 2 Drawing Sheets

[Fig. 1]
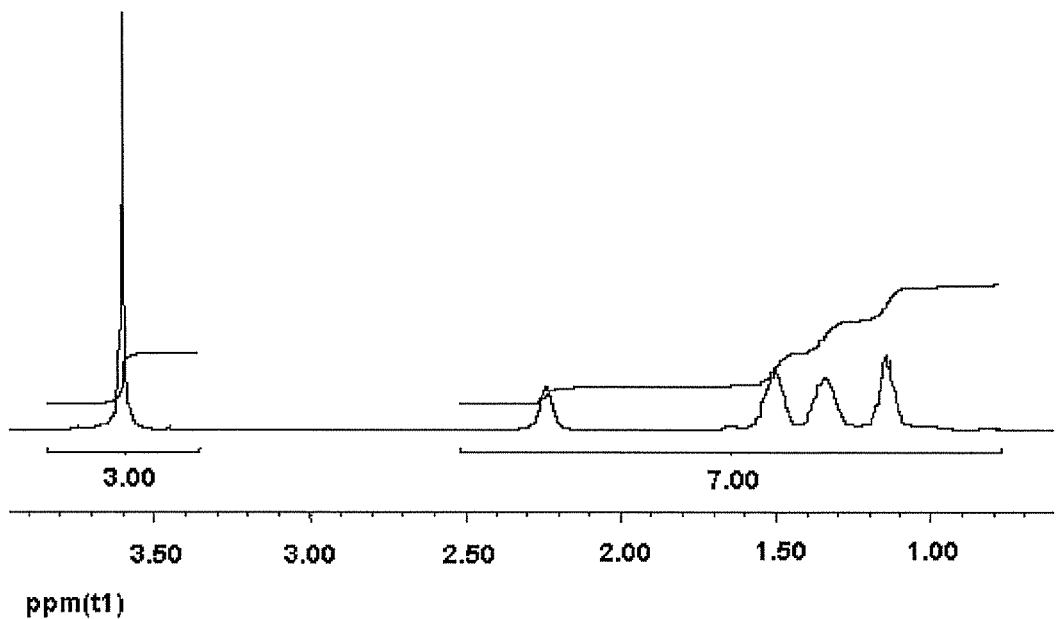
[Fig. 2]
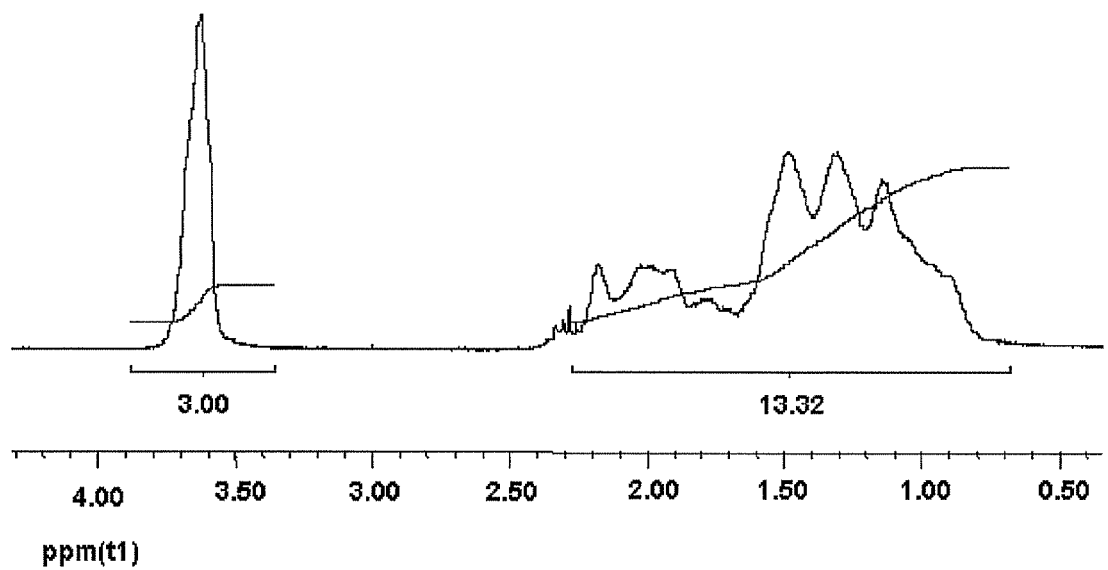

[Fig. 3]
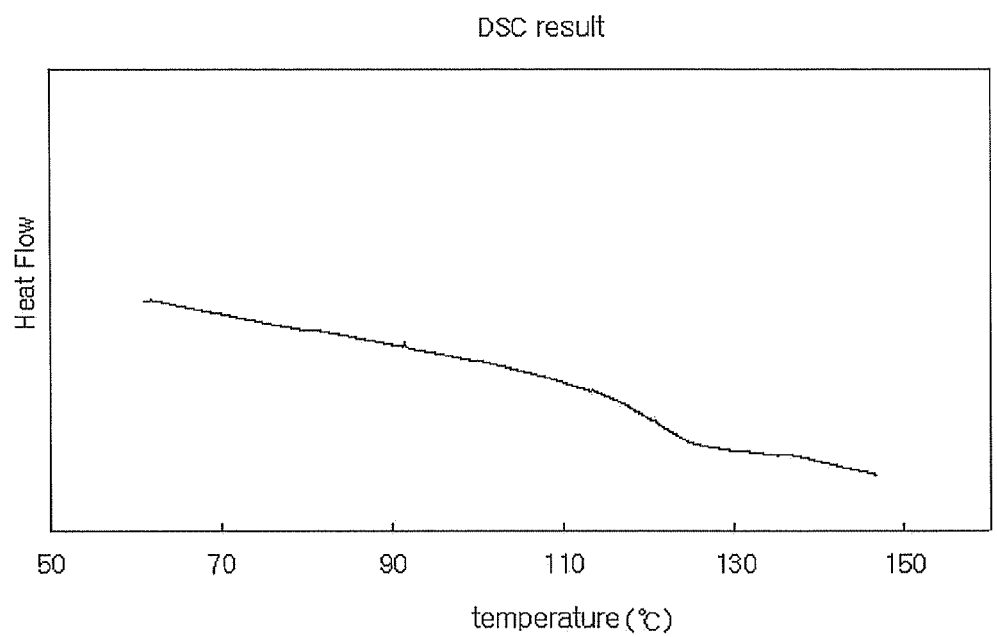
[Fig. 4]
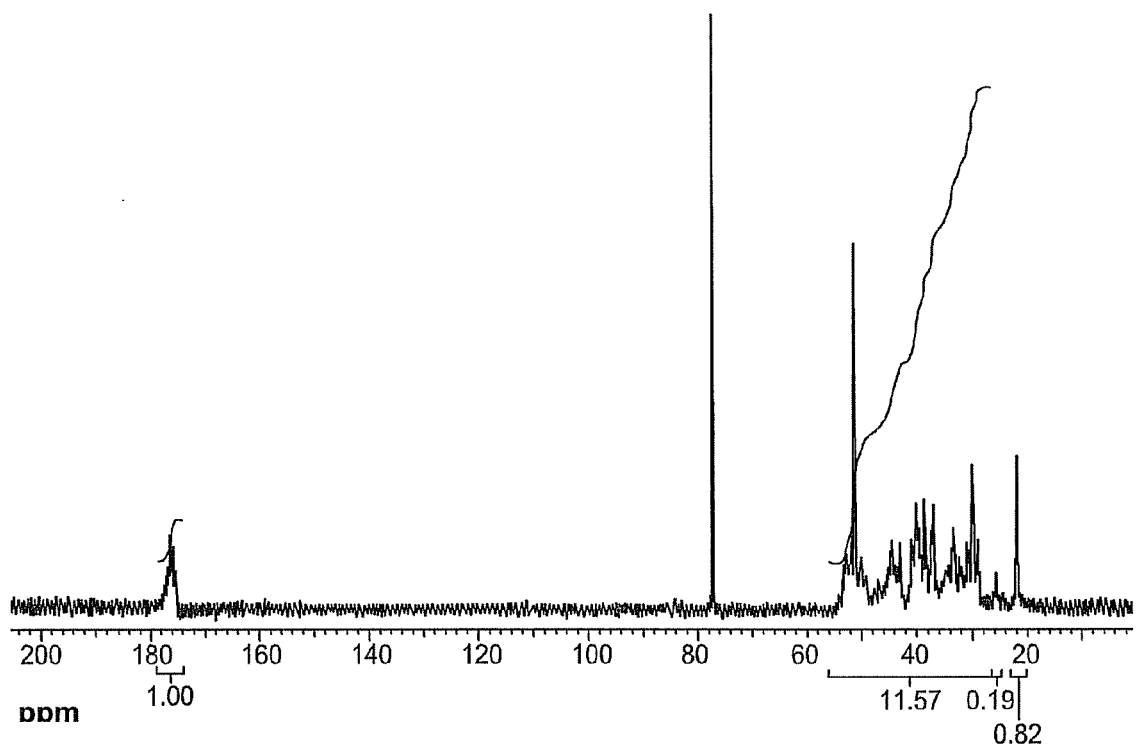

ALKENE-ACRYLATE-NORBORNENE TERPOLYMER AND METHOD FOR PREPARING THE SAME

This application claims the benefit of the filing date of Korean Patent Application No. 10-2006-0038843 filed on Apr. 28, 2006 in the Korean Intellectual Property Office, the disclosure of which is incorporated herein in its entirety by reference.

TECHNICAL FIELD

The present invention relates to alkene-acrylate-norbornene terpolymer and method for preparing the same, and particularly to alkene-acrylate-norbornene terpolymer and method for preparing the same produced by radical polymerization of alkene, acrylate and norbornene monomers under the presence of a metal oxide or Lewis acid.

BACKGROUND ART

In the conventional technology, a method of preparing copolymer of 1-alkene and vinyl monomer using a metallic complex compound catalyst has been known. Due to high affinity of a metal to oxygen, however, the method has a disadvantage that the metallic complex compound catalyst based on transition metal and lanthanide-based metal in the first development stage is easily contaminated by a functional group (C=O) of a polar vinyl monomer. Although it has been reported that the copolymer of alkyl acrylate and 1-alkene may be prepared using a metallic complex compound catalyst based on some of transition metal in the later development stage, the copolymer still has a large amount of 1-alkene.

The 1-alkene-based copolymer prepared by using the metallic complex compound catalyst includes only a small amount of a polar group so that polyolefin crystals remain in the copolymer, which is not desired for optical products, such as a transparent film.

On the other hand, in order to overcome the disadvantage of the polymerization method by the metallic complex compound catalyst, that the metallic complex compound catalyst is contaminated by oxygen existing in a polar group and the activity of the metallic complex compound catalyst thus decreases and that a polymer having a small amount of a polar group contained therein is obtained, a controlled radical polymerization has been proposed. When the copolymer of 1-alkene and polar vinyl monomer is produced by ATRP (Atom Transfer Radical Polymerization) method, which is a representative polymerization method among the controlled radical polymerization methods, the amount of the polar vinyl monomer is larger than that of 1-alkene, contrary to the polymerization method by the metallic complex compound catalyst. That is, a random copolymer in which the amount of 1-alkene is controlled in some degrees according to the conditions of copolymerization may be produced. However, when the copolymer is produced by ATRP method, it takes long time to obtain high molecular weight and the copolymer having the so small amount of 1-alkene is obtained.

In addition, the 1-alkene-alkyl(meth)acrylate copolymer produced by the ATRP method has the small amount of ethylene in the polymer chain so that the copolymer can be easily broken and thus film properties decrease.

Since 1-alkene-acrylate-based copolymer has high transparence and adhesiveness, the polymer may be used for optical products. To do this, its thermal resistance should be excellent so that there is no deformation occurred by heat created when process of preparation and optical instruments are operating. Accordingly, there is a need to develop terpolymers including further a new monomer which can improve properties such as the thermal resistance.

DISCLOSURE OF INVENTION

The first technical task of the present invention for solving the problems of the conventional technique is to provide method of preparing alkene-acrylate-norbornene terpolymer. The second technical task of the present invention is to provide terpolymer prepared by the method, which are suitable for an optical film. The third technical task of the present invention is to provide an optical film including the terpolymer.

The present invention, in order to achieve the first technical task, provides method of preparing alkene-acrylate-norbornene terpolymer by polymerization of a monomer mixture consisting of alkene, acrylate and norbornene by a radical initiator under the presence of a metal oxide or Lewis acid.

The present invention, in order to achieve the second technical task, provides alkene-acrylate-norbornene terpolymer.

The present invention, in order to achieve the third technical task, provides optical films including the alkene-acrylate-norbornene terpolymer.

The present invention will now be described in detail.

The present invention provides alkene-acrylate-norbornene terpolymer.

The acrylate-based monomer used for the alkene-acrylate-norbornene terpolymer of the present invention may be all compounds having a double bond between the carbons conjugated with carbonyl groups of ester groups, that is, their substituents are not particularly limited. The acrylate-based monomer may therefore include monomers of acrylate derivatives, such as alkyl acrylate and alkyl(meth)acrylate, as well as acrylate, and all acrylate-based monomers used in the art can be used.

For example, the acrylate-based monomer can be a compound as represented in Formula 1.

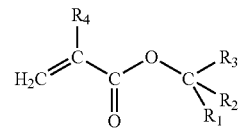

[Formula 1]

In the Formula 1,
$R_1$, $R_2$ and $R_3$ are hydrogen atom, substituted or unsubstituted C1-C30 hydrocarbon group, or atomic group of (I) including a heteroatom, respectively and independently; and $R_4$ is hydrogen atom or C1-C6 alkyl group, particularly methyl group.

In the Formula 1, the $R_1$, $R_2$ and $R_3$ also are, respectively and independently, hydrogen atom; substituted or unsubstituted C1-C6 alkyl group, substituted or unsubstituted C5-C12 aryl group, substituted or unsubstituted C6-C18 aryl alkyl group, substituted or unsubstituted C5-C12 alkyl aryl group, or substituted or unsubstituted C1-C6 alkoxy group; substituted or unsubstituted carbamoyl group; substituted or unsubstituted amino group; or substituted or unsubstituted silyl group.

The substituent group is preferably amino group, C1-C6 alkoxy group, carbamoyl group or silyl group.

The acrylate monomer as represented in Formula 1 is preferably methyl acrylate, ethyl acrylate, n-butyl acrylate, iso-butyl acrylate, t-butyl acrylate, n-hexyl acrylate, 2-ethylbutyl acrylate or 2-ethylhexyl acrylate, and acrylic acid ester of neo-isomer of C5-C12 alcohol, and the preferable comonomer is particularly n-alkyl methacrylate.

In addition, compounds or mixtures thereof as represented in Formulas 2 to 5 can be used as the acrylate monomer.

[Formula 2]

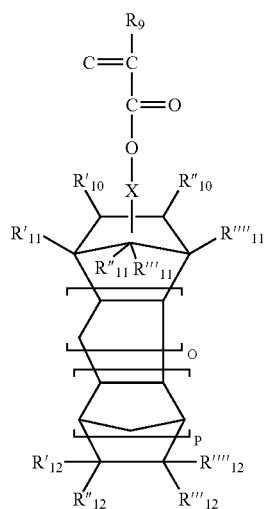

[Formula 3]

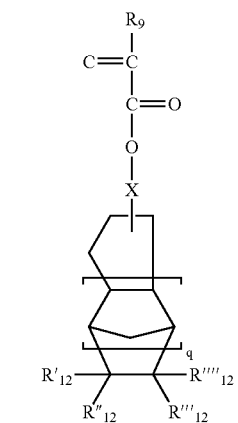

[Formula 4]

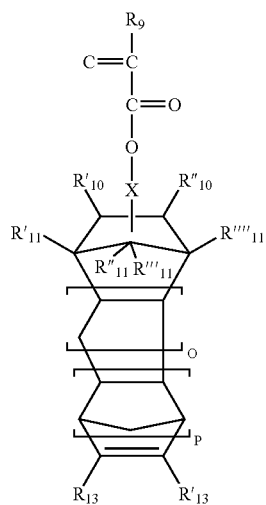

[Formula 5]

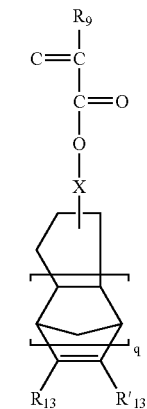

In Formulas 2 to 5, o, p and q are a positive number of 0~2, respectively and independently, x is just single bond, in profile of acryloyl, or a (II) connector of $-(CH_2)_r-$, $-(C_2H_4O)_r-$, $-(C_3H_6O)_r-$, or $-(C_4H_8)_r-$ (r is a positive number of 1~5), $R_9$ is hydrogen or methyl group, $R'_{10}$ and $R''_{10}$ are hydrogen, $R'_{11}$, $R''_{11}$, $R'''_{11}$ and $R''''_{11}$ are hydrogen or methyl group (one among $R'_{10}$, $R''_{10}$, $R'_{11}$, $R''_{11}$, $R'''_{11}$ and $R''''_{11}$ is substituted with the x group), and $R'_{12}$, $R''_{12}$, $R'''_{12}$, $R''''_{12}$, $R_{13}$, and $R'_{13}$ are respectively, hydrogen; halogen; substituted or unsubstituted C1-C20 hydrocarbon group, bonding directly to a cyclic structure

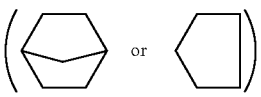

or bonding via a connector including oxygen, nitrogen sulfur or silicon; or polar group.

When the -x-group is single bond, the $-C(O)O-$ group of acrylate is directly bonded to

In $R'_{12}$, $R''_{12}$, $R'''_{12}$, $R''''_{12}$, $R_{13}$, and $R'_{13}$ of the Formulas 2 to 5, the halogen can be fluoride, chloride or bromide.

In $R'_{12}$, $R''_{12}$, $R'''_{12}$, $R''''_{12}$, $R_{13}$, and $R'_{13}$ of the Formulas 2 to 5, C1-C20 hydrocarbon group can be alkyl group such as methyl group, ethyl group, propyl group, isopropyl group, butyl group and isobutyl group; cycloalkyl group such as cyclopentyl group and cyclohexyl group; aryl group such as phenyl group, naphthyl group and anthracenyl group; alkaryl group such as methylphenyl group, ethylphenyl group and isopropylphenyl group; and aralkyl group such as benzyl group and phenethyl group. A part or whole of the hydrogen atoms in such hydrocarbon can be substituted, and the substituent can be halogen such as fluoride, chloride or bromide; cyano group; or phenylsulfonyl group.

In $R'_{12}$, $R''_{12}$, $R'''_{12}$, $R''''_{12}$, $R_{13}$, and $R'_{13}$ of the Formulas 2 to 5, the substituted or unsubstituted hydrocarbon group can be directly bonded to a cyclic structure

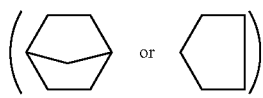

or bonded to a cyclic structure through a connector including oxygen, nitrogen, sulfur or silicon. The connector can be C(=O)—, —C(=O))O—, —OC(=O)—, —SO$_2$—, —O—, —S—, —NH—, —NHCO—, —CONH—, or —OSi(R)$_2$— (in the Formulas, R is alkyl group such as methyl group and ethyl group), and the connector can also be a connector formed by the same kind or different kinds of connectors being bonded with each other.

In $R'_{12}$, $R''_{12}$, $R'''_{12}$, $R''''_{12}$, $R_{13}$, and $R'_{13}$ of the formulas 2 to 5, a polar group can be hydroxyl group, cyano group (—CN), amide group (—CONH), —NH$_2$, carboxylic group, or imide ring—included group; trialkylsilyl group such as trimethylsilyl group and triethylsilyl group; or trialkoxysilyl group such as trimethoxysilyl group and triethoxysilyl group.

More specifically, acrylate monomers as represented in the Formulas 2 to 5 are

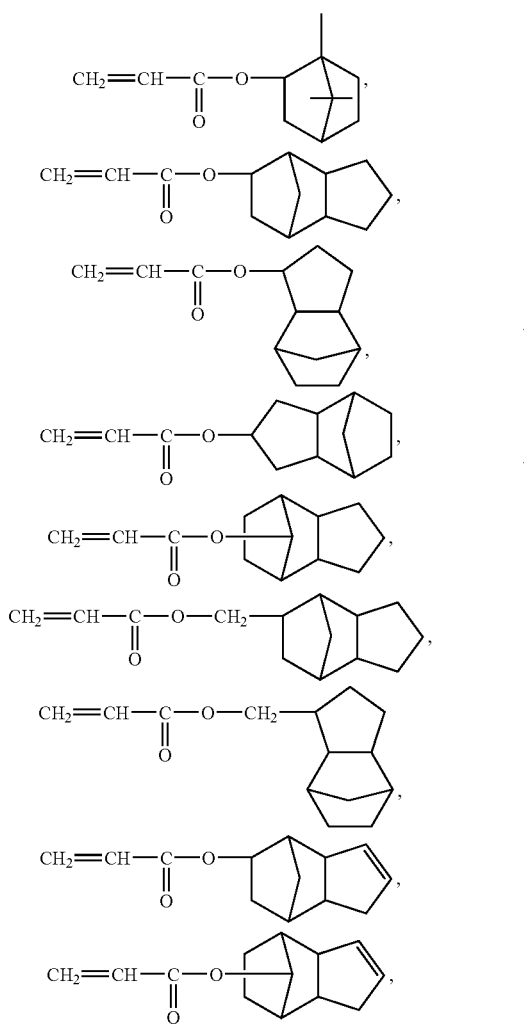

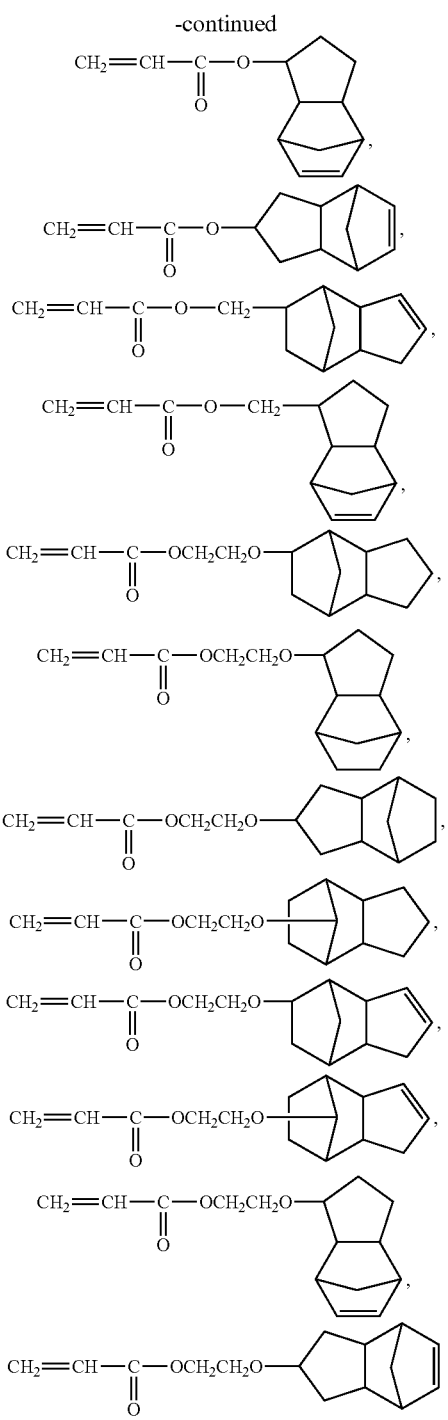

or a mixture thereof.

As another example, the acrylate-based monomer can be one selected from the group consisting of alkyl acrylate, alkyl(meth)acrylate, alkyl butacrylate, alkyl acrylic acid, alkyl ester and mixtures thereof, wherein the alkyl group can be a linear or branched C1-C12 alkyl group.

As another example, the acrylate-based monomer can be acrylic acid or methacrylic acid ester of a linear or branched C1-C12 alcohol, and preferably acrylic acid or methacrylic acid ester of a linear or branched C1-C8 alcohol.

As another example, the acrylate-based monomer can be methyl acrylate, ethyl acrylate, n-butyl acrylate, iso-butyl acrylate, t-butyl acrylate, n-hexyl acrylate, 2-ethylbutyl acrylate or 2-ethylhexyl acrylate; and acrylic acid ester of a neo-isomer of C5-C12 alcohol, and preferably, an n-alkyl methacrylate.

The alkyl acrylate monomer or the alkyl(meth)acrylate ester monomer can be used alone or in combination.

The amount of such acrylate-based monomer used in the alkene-acrylate-norbornene terpolymers is, based on the total amount of the monomers mixture, 30~99 mol %, preferably 35~99 mol % or 40~99 mol %, more preferably 50~99 mol % or 50~95% mol, and further preferably 50~90 mol %. As the amount of the acrylate-based comonomer increases, the terpolymers become to have no crystallinity and thus amorphous terpolymers can be prepared. The amorphous terpolymers can be used for optical products since they have high transparency and adhesiveness. In addition, the amorphous terpolymers can be used for an electrical device since they have high adhesiveness to metal due to a great amount of the polar functional group. In the reaction, when the amount of the acrylate-based comonomer is less than 30 mol % based on the total amount of the monomers mixture, the terpolymers may be in trouble in view of adhesiveness, and when the amount of the monomer is more than 99 mol %, the terpolymers may be brittle.

The alkene used for preparing the alkene-acrylate-norbornene terpolymer is alkene having a double bond at the terminal or in the middle of a carbon chain. The 1-alkene can be, for example, ethylene, propylene, 1-butene, 1-pentene, 1-hexene, 1-heptene, 1-octene, 1-nonene or 1-decene, and the alkene having the double bone in the middle of the carbon chain can be, for example, 2-butene, 2-pentene, 2-hexene, 3-hexene, 2-heptene, 2-octene or 2-nonene.

The amount of the alkene contained as a repetitive unit in the terpolymer of the present invention is preferably 1~50 mol %. The appropriate amount of the alkene of the repetitive unit may alleviate and cure the shortcoming in which the terpolymer can be easily broken due to the acrylate that is the polar group monomer.

The norbornene used in the alkene-acrylate-norbornene terpolymer is preferably a compound as represented in Formula 6.

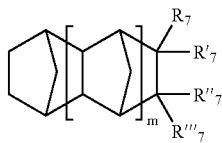

[Formula 6]

In the Formula 6,
m is a positive number of 0~4,
$R_7$, $R'_7$, $R''_7$ and $R'''_7$ are a polar functional group or a nonpolar functional group, respectively and independently.
$R_7$, $R'_7$, $R''_7$ and $R'''_7$ can form C4-C12 saturated or unsaturated cyclic group, or C6-C24 aromatic ring.

The nonpolar functional group is hydrogen; halogen; a linear or branched C1-C20 alkyl, haloalkyl, alkenyl, or haloalkenyl;

a linear or branched C3-C20 alkynyl, or haloalkynyl; alkyl-, alkenyl-, alkynyl-, halogen-, haloalkyl-, haloalkenyl-, or haloalkynyl-substituted or unsubstituted C3-C12 cycloalkyl; alkyl-, alkenyl-, alkynyl-, halogen-, haloalkyl-, haloalkenyl-, or haloalkynyl-substituted or unsubstituted C6-C40 aryl; or alkyl-, alkenyl-, alkynyl-, halogen-, haloalkyl-, haloalkenyl-, or haloalkynyl-substituted or unsubstituted C7-C15 aralkyl;

the polar functional group is non-hydrocarbonaceous polar group including at least one oxygen, nitrogen, phosphorus, sulfur, silicon or boron, for example, $-R^8OR^9$, $-OR^9$, $-OC(O)OR^9$, $-R^8OC(O)OR^9$, $-C(O)R^9$, $-R^8C(O)R^9$, $-OC(O)R^9$, $-R^8C(O)OR^9$, $-C(O)OR^9$, $-R^8OC(O)R^9$, $-(R^8O)_k-R^9$, $-(R^8O)_k-OR^9$, $-C(O)-O-C(O)R^9$, $-R^8C(O)-O-C(O)R^9$, $-SR^9$, $-R^8SR^9$, $-SSR^9$, $-R^8SSR^9$, $-S(=O)R^9$, $-R^8S(=O)R^9$, $-R^8C(=S)R^9$, $-R^8C(=S)SR^9$, $-R^8SO_3R^9$, $-SO_3R^9$, $-R^8N=C=S$, $-NCO$, $-R^8-NCO$, $-CN$, $-R^8CN$, $-NNC(=S)R^9$, $-R^8NNC(=S)R^9$, $-NO_2$, $-R^8NO_2$,

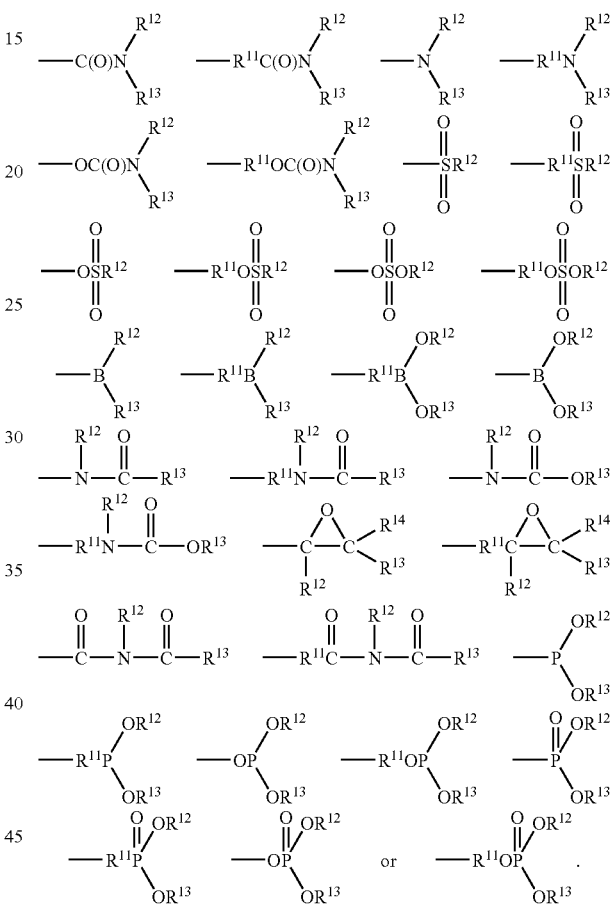

In the polar functional group,
$R^8$ and $R^{11}$ are, respectively and independently, a linear or branched C1-C20 alkylene, haloalkylene, alkenylene, or haloalkenylene; a linear or branched C3-C20 alkynylene, or haloalkynylene; alkyl-, alkenyl-, alkynyl-, halogen-, haloalkyl-, haloalkenyl-, haloalkynyl-substituted or unsubstituted C3-C12 cycloalkylene; alkyl-, alkenyl-, alkynyl-, halogen-, haloalkyl-, haloalkenyl-, haloalkynyl-substituted or unsubstituted C6-C40 arylene; or alkyl-, alkenyl-, alkynyl-, halogen-, haloalkyl-, haloalkenyl-, haloalkynyl-substituted or unsubstituted C7-C15 aralkylene;

$R^9$, $R^{12}$, $R^{13}$ and $R^{14}$ are, respectively and independently, hydrogen; halogen; a linear or branched C1-C20 alkyl, haloalkyl, alkenyl, or haloalkenyl; a linear or branched C3-C20 alkynyl, or haloalkynyl; alkyl-, alkenyl-, alkynyl-, halogen-, haloalkyl-, haloalkenyl-, or haloalkynyl-substituted or unsubstituted C3-C12 cycloalkyl; alkyl-, alkenyl-, alkynyl-, halogen-, haloalkyl-, haloalkenyl-, or haloalkynyl-substituted or unsubstituted C6-C40 aryl; alkyl-, alkenyl-, alkynyl-, halogen-, haloalkyl-, haloalkenyl-, or haloalkynyl-substituted or unsubstituted C7-C15 aralkyl; or alkoxy, haloalkoxy, carbonyloxy, halocarbonyloxy;

each of k is a positive number of 1~10.

The norbornene is, more preferably, at least one selected from 5-ethylester-2-norbornene, t-butyl-5-norbornene-2-carboxylate (NB-TBE), methyl-5-norbornene-2-methyl-2-carboxylate (Nb-MMA), 5-methylene-2-norbornene, and 5-n-butyl-2-norbornene.

The amount of the norbornene contained as a repetitive unit in the terpolymer of the present invention is preferably 1~50 mol %. The appropriate amount of the alkene repetitive unit may contribute to increase of the glass transition temperature and thus the thermal resistance of the terpolymer increases.

A representative example of the alkene-acrylate-norbornene terpolymer of the present invention may be 1-alkene-acrylate-norbornene terpolymer as represented in Formula 7.

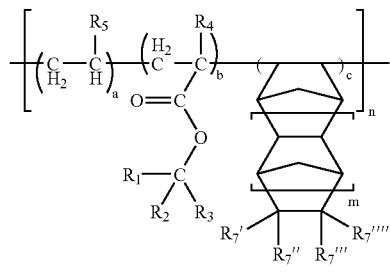

[Formula 7]

In the Formula 7, $R_1$, $R_2$ and $R_3$ are hydrogen atom, substituted or unsubstituted C1-C30 hydrocarbon group, or atomic group of (I) including or not including a heteroatom, respectively and independently;

$R_4$ is hydrogen atom or methyl group;

$R_5$ is hydrogen atom or C1-C10 alkyl group;

$R_7$, $R'_7$, $R''_7$, and $R'''_7$ are, respectively and independently, a polar functional group or a non-polar functional group; $R_7$, $R'_7$, $R''_7$, and $R'''_7$ can form C4-C12 saturated or unsaturated cyclic group, or C6-C24 aromatic ring;

m is a positive number of 0~4;

n means a repetition of arrangement of the monomers repetitive units;

a, b and c are a minimum number determined depending on the amount (mol %) of each of the monomers which is 1~50 mol % of the alkene repetitive unit, 30~98 mol % of the acrylate repetitive unit, and 1~50 mol % of the norbornene repetitive unit. The number may be a positive number in the arrangement of one repetitive unit, but be a real number in an average value of the total terpolymer. Accordingly, the terpolymer of the present invention is terpolymerized randomly by each of the monomers. That is, for example, when the amount ratio of each of the monomer is 1:1:1, a=b=c=1 on average. On the other hand, when the amount ratio of each of the monomers is 1:2:1 in order, a=1, b=2 and c=1 on average. In addition, when the amount ratio of each of the monomers is 1:2.2:0.7, a, b and c must be an integer (for example, 1:2:1, 1:3:1, and 2:4:1) in the each of the arrangement of the monomer repetitive unit. On the other hand, in such case, the average value thereof may be the same 1:2.2:0.7 as the amount ratio of the monomers.

The terpolymer has the acrylate repetitive unit as primary component. The amount of the alkene repetitive unit and the norbornene repetitive unit may be respectively controlled in the range of 70 mol % or less, preferably 50 mol % or less so that properties may be easily controlled.

In the alkene-acrylate-norbornene terpolymer as represented in the Formula 7, the $R_1$, $R_2$ and $R_3$ are, respectively and independently, hydrogen atom; substituted or unsubstituted C1-C6 alkyl group, substituted or unsubstituted C5-C12 aryl group, substituted or unsubstituted C6-C18 aryl alkyl group, substituted or unsubstituted C5-C12 alkyl aryl group, or substituted or unsubstituted C1-C6 alkoxy group; substituted or unsubstituted carbamoyl group; substituted or unsubstituted amino group; or substituted or unsubstituted silyl group.

The substituent group is preferably amino group, C1-C6 alkoxy group, carbamoyl group or silyl group.

The non-polar functional group of the norbornene in the alkene-acrylate-norbornene terpolymer is hydrogen; halogen; a linear or branched C1-C20 alkyl, haloalkyl, alkenyl, or haloalkenyl; a linear or branched C3-C20 alkynyl, or haloalkynyl; alkyl-, alkenyl-, alkynyl-, halogen-, haloalkyl-, haloalkenyl-, or haloalkynyl-substituted or unsubstituted C3-C12 cycloalkyl; alkyl-, alkenyl-, alkynyl-, halogen-, haloalkyl-, haloalkenyl-, or haloalkynyl-substituted or unsubstituted C6-C40 aryl; or alkyl-, alkenyl-, alkynyl-, halogen-, haloalkyl-, haloalkenyl-, or haloalkynyl-substituted or unsubstituted C7-C15 aralkyl;

the polar functional group is non-hydrocarbonaceous polar group including at least one oxygen, nitrogen, phosphorus, sulfur, silicon or boron, for example, $-R^8OR^9$, $-OR^9$, $-OC(O)OR^9$, $-R^8OC(O)OR^9$, $-C(O)R^9$, $-R^8C(O)R^9$, $-OC(O)R^9$, $-R^8C(O)OR^9$, $-C(O)OR^9$, $-R^8OC(O)R^9$, $-(R^8O)_k-R^9$, $-(R^8O)_k-OR^9$, $-C(O)-O-C(O)R^9$, $-R^8C(O)-O-C(O)R^9$, $-SR^9$, $-R^8SR^9$, $-SSR^9$, $-R^8SSR^9$, $-S(=O)R^9$, $-R^8S(=O)R^9$, $-R^8C(=S)R^9$, $-R^8C(=S)SR^9$, $-R^8SO_3R^9$, $-SO_3R^9$, $-R^8N=C=S$, $-NCO$, $-R^8-NCO$, $-CN$, $-R^8CN$, $-NNC(=S)R^9$, $-R^8NNC(=S)R^9$, $-NO_2$, $-R^8NO_2$,

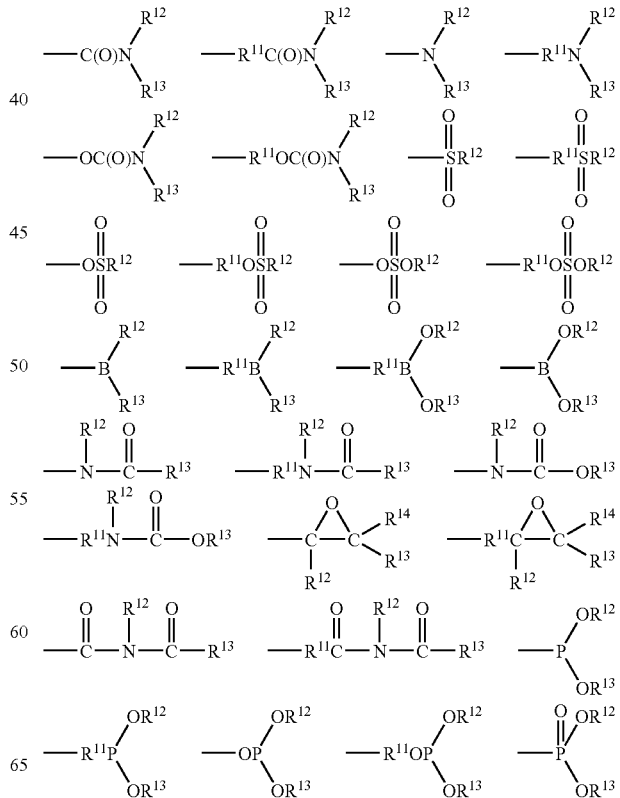

-continued

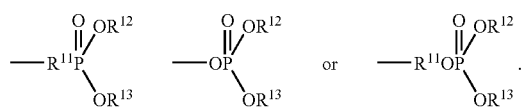

In the polar functional group, $R^8$ and $R^{11}$ are, respectively and independently, a linear or branched C1-C20 alkylene, haloalkylene, alkenylene, or haloalkenylene; a linear or branched C3-C20 alkynylene, or haloalkynylene; alkyl-, alkenyl-, alkynyl-, halogen-, haloalkyl-, haloalkenyl-, haloalkynyl-substituted or unsubstituted C3-C12 cycloalkylene; alkyl-, alkenyl-, alkynyl-, halogen-, haloalkyl-, haloalkenyl-, haloalkynyl-substituted or unsubstituted C6-C40 arylene; or alkyl-, alkenyl-, alkynyl-, halogen-, haloalkyl-, haloalkenyl-, haloalkynyl-substituted or unsubstituted C7-C15 aralkylene, $R^9$, $R^{12}$, $R^{13}$ and $R^{14}$ are, respectively and independently, hydrogen; halogen; a linear or branched C1-C20 alkyl, haloalkyl, alkenyl, or haloalkenyl; a linear or branched C3-C20 alkynyl, or haloalkynyl; alkyl-, alkenyl-, alkynyl-, halogen-, haloalkyl-, haloalkenyl-, or haloalkynyl-substituted or unsubstituted C3-C12 cycloalkyl; alkyl-, alkenyl-, alkynyl-, halogen-, haloalkyl-, haloalkenyl-, or haloalkynyl-substituted or unsubstituted C6-C40 aryl; alkyl-, alkenyl-, alkynyl-, halogen-, haloalkyl-, haloalkenyl-, or haloalkynyl-substituted or unsubstituted C7-C15 aralkyl; or alkoxy, haloalkoxy, carbonyloxy, halocarbonyloxy;

each of k is a positive number of 1~10.

A representative example of the alkene-acrylate-norbornene terpolymer of the present invention may be 1-alkene-acrylate-norbornene terpolymer as represented in Formulas 8~11.

[Formula 8]

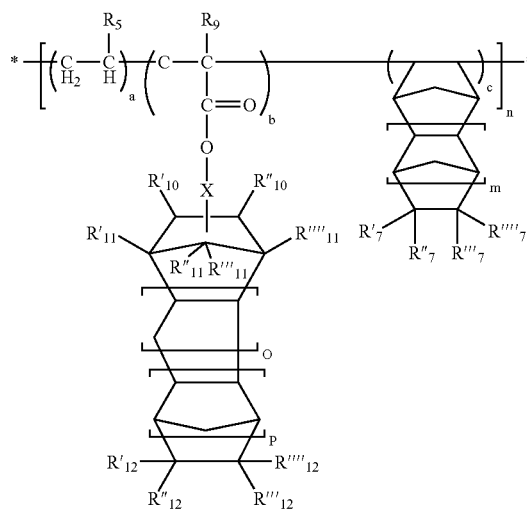

[Formula 9]

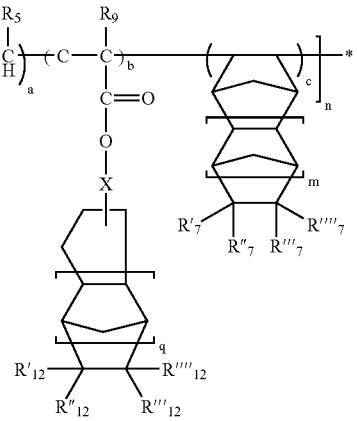

[Formula 10]

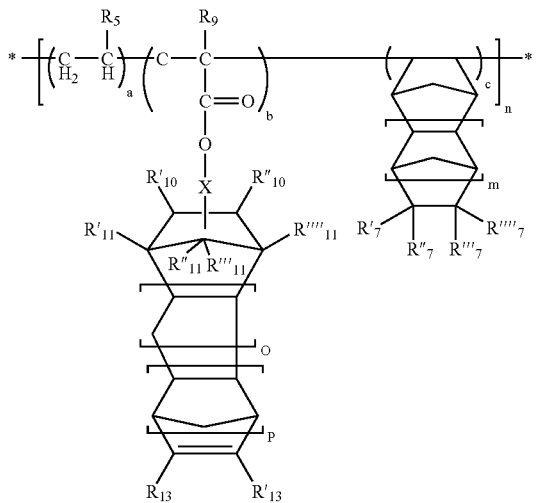

[Formula 11]

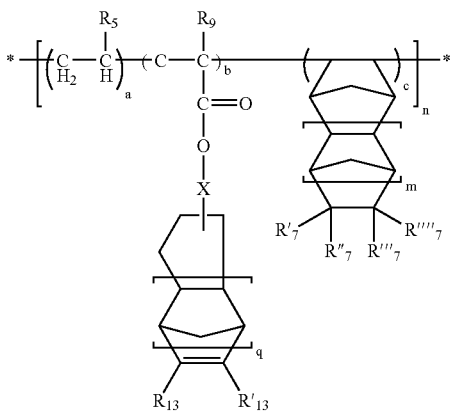

In the Formulas 8~11, a, b, c, $R_5$, $R_9$, $R_7'$, $R_7''$, $R_7'''$, $R_7''''$, $R'_{10}$, $R''_{10}$, $R'_{11}$, $R''_{11}$, $R'''_{11}$, $R''''_{11}$, $R'''''_{11}$, $R'_{12}$, $R''_{12}$, $R'''_{12}$, $R''''_{12}$, $R_{13}$, $R'_{13}$, x, m, n, o, p, and q are the same as defined in the Formulas 1~7.

The alkene-acrylate-norbornene terpolymer of the present invention may have a glass transition temperature (Tg) of −50~300° C. The alkene-acrylate-norbornene terpolymer may have a number average molecular weight of 5,000~400,000, and a weight average molecular weight of 10,000~800,000. The temperature (Td_50), that 50% of the initial weight is decomposed, of the alkene-acrylate-norbornene terpolymer is preferably 300~500° C.

The present invention provides method of preparing alkene-acrylate-norbornene terpolymer. The present invention is to obtain alkene-acrylate-norbornene terpolymer by polymerization of the monomer mixture consisting of alkene, acrylate and norbornene by a radical initiator under the presence of a metal oxide or Lewis acid. Unlike the conventional technique, it is possible to avoid the condition of high temperature and high pressure in the reaction of the present method by using the Lewis acid in the radical polymerization reaction. Accordingly, the efficiency of the process is highly improved.

The examples and the amounts used in the method of the present invention, and the structures and the properties of the terpolymers produced are the same as described above.

As for the Lewis acid and metal oxide represented in the present specification, since the metal oxide used in the present invention acts as Lewis acid, which provides substantially an acid site in the polymerization reaction of the present invention, the metal oxide is conceptually included in the Lewis acid. However, unlike other general Lewis acids, the metal oxide has additional advantages that the metal oxide does not change its structure or composition even after the polymerization reaction so that it can be easily separated and reused. Accordingly, in the present specification, it is named as metal oxide or complex metal oxide, for the purpose of distinguishing from the other general Lewis acids.

The metal oxide used in the present invention may be preferably a compound as represented in Formula 12.

 [Formula 12]

In the Formula 12,

M is at least one selected from the group consisting of alkali earth metals, transition metals, 13 group and 14 group metals;

N is a 5 group or 6 group atom;

O is oxygen atom;

x, y and z are, respectively a value determined by state of oxidation of M and N, $x>0$, $y\geq 0$ and $z>0$.

The metal oxide can be, more particularly, at least one selected from the group of metal oxides consisting of $Al_2O_3$, $Y_2O_3$, $ZrO_2$, $HfO_2$, $SiO_2$, $B_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, SnO and $TiO_2$; and complex metal oxides consisting of $Dy_3Al_5O_{12}$, $Y_3Al_5O_{12}$, $Al_2O_3 \cdot TiO_2$, $3Al_2O_3 \cdot SiO_2$, $CaTiO_3$, $CaZrO_3$, $FeTiO_3$, $MgO \cdot Al_2O_3$, $CeAl_{11}O_{18}$, $Al_2(SO_4)_3$, and $AlPO_4$, but is not limited thereto.

The metal oxide can be used in the range of 0.01~200 mol % based on the acrylate-based monomer in the method of preparing the alkene-acrylate-norbornene terpolymer.

When the amount of the metal oxide is less than 0.01 mol %, there is a problem that the amount of the 1-alkene monomer is low in the copolymer. On the other hand, when the amount of the metal oxide is greater than 200 mol %, there is no problem in use of a column-type polymerization device but there is a problem that the stirring velocity decreases in use of a stirring polymerization device. Accordingly, when the stirring polymerization device is used, it is desired to use the metal oxide of less than 200 mol %.

Since the metal oxide used in the present invention can be recovered nearly 100% by a physical method using only filtering device and the recovered metal oxide can be reused for the polymerization, such metal oxide provides advantages that the copolymer can be obtained economically with high purity. In addition, additional processes in the former and post stages for use of the metal oxide, such as acid treatment, dry and burning processes in both initial use and reuse are not required, and the only metal oxide itself is used. Accordingly, the process is simple. The recovered metal oxide can be reused generally more than 20 times.

The Lewis acid in the method of preparing the alkene-acrylate-norbornene terpolymer of the present invention may include at least one metal cation selected from the group consisting of scandium, titanium, vanadium, chrome, manganese, iron, cobalt, copper, zinc, boron, aluminum, yttrium, zirconium, niobium, molybdenum, cadmium, rhenium, and tin, and be an inorganic or organic metal compound.

The Lewis acid also may include at least one anion selected from the group consisting of halide, triflate, $HPO_3^{2-}$, $H_3PO^{2-}$, $CF_3COO^-$, $C_7H_{15}OSO^{2-}$ and $SO_4^{2-}$, and be an inorganic or organometallic compound The Lewis acid used in the present invention can be a Lewis acid of halide compounds, such as boron trifluoride, ethylboron dichloride, boron trifluoride, boron tribromide, boron triiodide, aluminum trichloride, aluminum tribromide, ethylaluminum dichloride, ethylaluminum sesquichloride, diethylaluminum chloride, stannic chloride, zinc dichloride, copper dichloride, and nickel chloride; or a Lewis acid of triflate compounds, such as aluminum triflate, scandium triflate, copper triflate, yttrium triflate, and zinc triflate, or a mixture thereof. The Lewis acid may be used with one species or a two species or more mixture.

For example, such inorganic or organometallic compound can be $ZnBr_2$, $ZnI_2$, $ZnCl_2$, $ZnSO_4$, $CuCl_2$, $CuCl$, $Cu(O_3SCF_3)_2$, $CoCl_2$, $CoI_2$, $FeI_2$, $FeCl_3$, $FeCl_2$, $FeCl_2$(THF)$_2$, $TiCl_3$(THF)$_2$, $TiCl_4$, $TiCl_3$, $ClTi(O$-i$-propyl)_3$, $MnCl_2$, $ScCl_3$, $AlCl_3$, $(C_8H_{17})AlCl_2$, $(C_8H_{17})_2AlCl$, (i-$C_4H_9)_2AlCl$, $(C_6H_5)_2AlCl$, $(C_6H_5)AlCl_2$, $ReCl_5$, $ZrCl_4$, $NbCl_5$, $VCl_3$, $CrCl_2$, $MoCl_5$, $YCl_3$, $CdCl_2$, $LaCl_3$, $Er(O_3SCF_3)_3$, $Yb(O_2CCF_3)_3$, $SmCl_3$, $B(C_6H_5)_3$ and $TaCl_5$, disclosed in U.S. Pat. Nos. 6,127,567; 6,171,996; and 6,380,421. The inorganic or organic metal compound can also be a metal salt, such as $ZnCl_2$, $CoI_2$ and $SnCl_2$; an organometallic compound, such as $RAlCl_2$, $RSnO_3SCF_3$ and $R_3B$ (R is an alkyl group or an aryl group), disclosed in U.S. Pat. Nos. 3,496,217; 3,496,218; and 4,774,353.

The inorganic or organometallic compound may comprise an anionic moiety selected from the group consisting of halides, such as fluorides, chlorides, bromides, and iodides; triflates; low aliphatic anions having 2~7 carbons; $HPO_3^{2-}$; $H_3PO^{2-}$; $CF_3COO^-$; $C_7H_{15}OSO^{2-}$; or $SO_4^{2-}$, and a cation metal moiety selected from the group consisting of zinc, cadmium, beryllium, aluminum, gallium, indium, thallium, titanium, zirconium, hafnium, erbium, germanium, tin, vanadium, niobium, scandium, chrome, molybdenum, tungsten, manganese, rhenium, palladium, thorium, iron, and cobalt, preferably the group consisting of zinc, cadmium, titanium, tin, chrome, iron, and cobalt, disclosed in U.S. Pat. No. 3,773, 809.

U.S. Pat. No. 3,773,809 disclosed examples of a cocatalyst, including borohydride, organic borohydride, and a boronic salt such as $R_3B$ or $B(OR)_3$ (R is selected from hydrogen, a C6-C18 aryl group, an aryl group substituted with a C1-C7 alkyl group, an aryl group substituted with a cyano-substituted C1-C7 alkyl group, preferably triphenylborane).

The Lewis acid used in the present invention can be a cocatalyst disclosed in U.S. Pat. Nos. 3,496,217; 3,496,218; 4,774,353; 4,874,884; 6,127,567; 6,171,996; and 6,380,421.

In particular, the Lewis acid can be a metal salt, preferably metal halide, such as fluorides, chlorides, bromides, and iodides, and preferably chlorides, and amongst the aluminum trichloride, zinc chloride, iron chloride(II), and iron chloride (III) are preferable.

In the method of preparing the alkene-acrylate-norbornene terpolymer, the amount of the Lewis acid to the acrylate monomer is preferably 0.01~100 mol %, more preferably 1~100 mol %, but is not limited thereto.

The amounts of the monomers included as the repetitive unit in the terpolymer prepared by using the metal oxide or the Lewis acid can be appropriately controlled and adjusted according to the properties. In particularly, when the alkene monomer dissolved partially in the solvent enters into the polymerization reaction, which exists with a gas phase in the reaction condition, such as ethylene or propylene, the metal oxide or the Lewis acid acts as a controller so that the appropriate amount of the alkene monomer which is needed for the properties of the terpolymers produced is polymerized, and as a helper so that the polymerization reaction can be carried out in a condition of low temperature and low pressure as described below.

In the method of preparing the alkene-acrylate-norbornene terpolymer, one species of compound or a two species or more mixture selected from the group consisting of peroxides and azo compounds can be used as the radical initiator.

Specifically, examples of the peroxides include hydrogen peroxide, decanoyl peroxide, t-butyl peroxy neodecanoate, t-butyl peroxy pivalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, t-amyl peroxy neodecanoate, t-amyl peroxy pivalate, t-amyl peroxy-2-ethyl hexanoate and 1,1,3,3-tetramethyl butyl hydroperoxide; and alkali metal persulfates, perborates, and percarbonates; and azo compounds such as 2,2'-azo-bis(isobutyronitrile) (AIBN).

The initiator can be preferably the azo compound. A mixture of such initiators can be used. The initiator can be added in an appropriate form into reaction stream. For example, the initiator can be added in a pure form and a form dissolved in an appropriate solvent and/or in a form stirred with a monomer or a monomer supply stream.

In the method of preparing the alkene-acrylate-norbornene terpolymer, the amount of the radical initiator to the acrylate monomer is preferably 0.01~1 mol %, but is not limited thereto.

In the method of preparing the alkene-acrylate-norbornene terpolymer, when the polymerization is performed under the presence of a solvent, the solvent can be selected from the group consisting of toluene, chlorobenzene, n-hexane, tetrahydrofuran, chloroform, and methylene chloride, but is not limited thereto, and solvents used in the art is available.

In the polymerization reaction of the present invention, a reaction pressure is not limited since the acrylate-based monomer and the norbornene monomer generally exist in a liquid phase under the reaction condition and such monomer is dissolved in a solvent and then can be involved in the polymerization reaction.

On the other hand, since the alkene monomer, particularly, ethylene or propylene exists in gas phase under a reaction condition, some pressure is required so that the alkene monomer is added in a repetitive unit of the terpolymer of the present invention with an appropriate amount. On the other hand, when the alkene monomer is 1-hexene and 1-decene existing in a liquid state, the reaction pressure is not limited.

In the method of preparing the alkene-acrylate-norbornene terpolymer, the polymerization reaction is preferably carried out at a temperature of 40~150° C. When the temperature is less than 40° C., the velocity of activation of the initiator is slow and it is not easy to control the reaction temperature. On the other hand, the temperature is greater than 150° C., an excess of the unreacted monomers may occur and it is difficult to control the process.

On the other hand, when the alkene is, for example, ethylene, the polymerization reaction is preferably carried out at a pressure of 10~200 bar. When the pressure is less than 5 bar, the amount of the 1-alkene is low in the polymer. On the other hand, when the pressure is greater than 200 bar, an additional device in process is required.

The present invention, in order to achieve the third technical task, provides an optical film including the alkene-acrylate-norbornene terpolymer. Since the optical film is prepared by using terpolymer resin having a high light transmittance, glass transition temperature and toughness, it may have the high light transmittance. In addition, since the terpolymer according to the present invention have the great amount of the monomer having the polar functional group so that they have excellent adhesiveness, they are suitable for a laminated film. Accordingly, the terpolymer according to the present invention is suitable for various optical film, such as a phase difference compensation film having a birefringence rate through stretching and a polarizing film through a post treatment with iodine solution.

BRIEF DESCRIPTION OF THE DRAWINGS

FIG. 1 illustrates a $^1$H-NMR spectrum of an ethylene-methyl acrylate copolymer obtained according to Comparative Example 1.

FIG. 2 illustrates a $^1$H-NMR spectrum of a methyl acrylate-2-norbornene copolymer obtained according to Comparative Example 3.

FIG. 3 is a graph illustrating results of differential scanning calorimetry (DSC) of ethylene-methyl acrylate-2-norbornene terpolymer obtained according to Example 3.

FIG. 4 illustrates a $^{13}$C-NMR spectrum of ethylene-methyl acrylate-2-norbornene terpolymer obtained according to Example 3.

BEST MODES FOR CARRYING OUT THE INVENTION

Hereinafter, the present invention will be described in further detail through examples. However, the following examples are only for the understanding of the invention and the invention is not limited to or by them.

Organic reagents and solvents used in the polymerization were produced by Aldrich Co. and refined by a standard method. Ethylene was prepared by passing a high purity product produced by Applied Gas Technology Co. through moisture and an oxygen filtering device, and then used in the polymerizing process.

In order to obtain the amount ratio of the monomer contained in the terpolymers, the structures of polymers were identified based on its spectrum obtained using a 500 MHz NMR device produced by Varian Co. The glass transition temperatures of polymers, which are thermal property of the yield polymers, were obtained using DSC Q100 produced by TA Instrument Co., and Td_50 (50% decomposition temperature) of the polymers were obtained using TGA produced by TA Instrument Co.

The molecular weights and molecular weight distributions of copolymers obtained according to Examples 1~8 were obtained through gel permeation chromatography (GPC) analysis in Waters Co. The analysis temperature was 25° C., and tetrahydrofuran (THF) was used as a solvent. The copolymers were standardized using polystyrene in order to obtain the number average molecular weights (Mn) and weight average molecular weights (Mw) thereof.

COMPARATIVE EXAMPLE 1

1-alkene-alkyl acrylate copolymer

A 125 ml high-pressure reactor was evacuated and then filled with argon. Then 2.4 g (27.8 mmol) of methyl acrylate (MA) and 3.74 g (28 mmol) of aluminum trichloride were added to the reactor. 0.27 mmol of AIBN acting as an initiator dissolved in toluene was also added to the reactor. Then the reactor was filled with 50 bar of ethylene and then the temperature of the reactor was increased to 65° C. and then the polymerization was performed in such a reactor for 20 hours.

COMPARATIVE EXAMPLE 2

A 125 ml high-pressure reactor was evacuated and then filled with argon. Then 4.8 g (55.9 mmol) of methyl acrylate (MA) and 3.74 g (28 mmol) of aluminum trichloride were added to the reactor. 0.17 mmol of AIBN acting as an initiator dissolved in toluene was also added to the reactor. Then the reactor was filled with 30 bar of ethylene and then the temperature of the reactor was increased to 65° C. and then the polymerization was performed in such a reactor for 20 hours.

Specific experimental conditions used in Comparative Examples 1 and 2 and results thereof are illustrated in Tables 1 and 2. A $^1$H-NMR spectrum illustrating an analysis result according to Comparative Example 1 is illustrated in FIG. 1.

TABLE 1

| | Temperature (° C.) | Time (h) | AIBN (mmol) | Toluene (ml) | MA(g) | Ethylene (bar) | AlCl$_3$:MA (mole ratio) |
|---|---|---|---|---|---|---|---|
| Comparative Example 1 | 65 | 20 | 0.27 | 20 | 2.4 | 50 | 1:1 |
| Comparative Example 2 | 65 | 20 | 0.17 | 20 | 4.8 | 30 | 1:2 |

TABLE 2

| | yield (g) | Ethylene amount (mol %) | Mw (g/mol) | Mw/Mn | Tg (° C.) | Td_50 (° C.) |
|---|---|---|---|---|---|---|
| Comparative Example 1 | 2.1 | 50 | 37500 | 2 | −16.3 | 432.2 |
| Comparative Example 2 | 2 | 33 | 121000 | 1.9 | −2 | 437.7 |

The experiment results of the Comparative Example 1 show the ethylene-methyl acrylate alternative copolymer having 50% of amount of the ethylene. This is the ethylene-methyl acrylate alternative copolymer having maximum amount of the ethylene capable in mechanism of the radical polymerization under the presence of the Lewis acid.

The experiment results of the Comparative Example 2, in comparison with the polymerization condition of the Comparative Example 1, show low amount of ethylene obtained by decreasing the pressure of the ethylene entered and inputted amount of the Lewis acid and show high molecular weight obtained by decreasing mole concentration of the initiator in comparison to the inputted monomer. The glass transition temperature higher than that of Example 1 was obtained due to lower amount of the ethylene. The random copolymers having the amount of the ethylene desired may be synthesized by controlling the polymerization condition according to the application field, and the changeable range of the amount of the ethylene is very broad, such as 0~50%.

The experiment results of the Comparative Examples 1 and 2 show too low a glass transition temperature, that is, 0° C. or less. By increasing the amount of the ethylene, the property in which the acrylate can be easily broken may be complemented and thus the polymer is suitable for forming of film, but the application range is limited due to the low glass transition temperature.

COMPARATIVE EXAMPLE 3 norbornene-alkyl acrylate copolymer

A 125 ml high-pressure reactor was evacuated and then filled with argon. Then 1.7 ml (18.7 mmol) of methyl acrylate (MA), 3.5 ml (37.4 mmol) of norbornene and 1.24 g (9.32 mmol) of aluminum trichloride were added to the reactor. 0.27 mmol of AIBN acting as an initiator dissolved in toluene was also added to the reactor. Then the temperature of the reactor was increased to 65° C. and then the polymerization was performed in such a reactor for 20 hours.

COMPARATIVE EXAMPLE 4

The polymerization was performed in the same conditions and method as Comparative Example 3, except that the reaction temperature is 60° C., the reaction time is 18 hours, and 5.25 ml (28.05 mmol) of norbornene, 1.7 ml (18.7 mmol) of the methyl acrylate, and 0.17 mmol of AIBN were added to the reactor.

Specific experimental conditions used in Comparative Examples 3 and 4 and results thereof are illustrated in Tables 3 and 4. A $^1$H-NMR spectrum illustrating an analysis result according to Comparative Example 3 is illustrated in FIG. 2.

tance as the glass transition temperature is 164.5° C., when the norbornene is copolymerized in 50 mol % with the methyl acrylate at the presence of the only Lewis acid with no differences from the conditions in the conventional free radical polymerization technique and process.

The experiment results of the Comparative Example 4 show the high weight average molecular weight of 178,000 obtained with keeping amount of the norbornene similarly by controlling the concentration of the initiator and the reaction temperature. It was identified that the molecular weight is easily increased by adjusting the reaction condition. The experiment results of the Comparative Example 4 also show the copolymerization by the norbornene to the acrylate can allow the copolymer to get the higher glass transition temperature.

EXAMPLE 1 alkene-acrylate-norbornene terpolymer

A 125 ml high-pressure reactor was evacuated and then filled with argon. Then 1.7 ml (18.7 mmol) of methyl acrylate (MA), 3.5 ml (37.4 mmol) of norbornene and 1.24 g (9.32 mmol) of aluminum trichloride were added to the reactor. 0.27 mmol of AIBN acting as an initiator dissolved in toluene was also added to the reactor. Then the reactor was filled with 30 bar of ethylene and then the temperature of the reactor was increased to 65□ and then the polymerization was performed in such a reactor for 20 hours.

TABLE 3

|  | Temperature (° C.) | Time (h) | AIBN (mmol) | Toluene (ml) | MA(g) | MA:norbornene (mole ratio) | AlCl$_3$:MA (mole ratio) |
| --- | --- | --- | --- | --- | --- | --- | --- |
| Comparative Example 3 | 65 | 20 | 0.27 | 20 | 18.7 | 1:2 | 1:2 |
| Comparative Example 4 | 60 | 18 | 0.17 | 20 | 18.7 | 1:1.5 | 1:2 |

TABLE 4

|  | yield (%) | norbornene amount (mol %) | Mw (g/mol) | Mw/Mn | Tg (° C.) | Td_50 (° C.) |
| --- | --- | --- | --- | --- | --- | --- |
| Comparative Example 3 | 62.5 | 50 | 43900 | 2.5 | 164.5 | 456.3 |
| Comparative Example 4 | 49.9 | 42 | 178000 | 2.3 | 152.3 | 451.1 |

The experiment results of the Comparative Example 3 show the norbornene-methyl acrylate alternative copolymer having 50% of amount of the norbornene. In case of a unicomponent polymer made of the methyl acrylate, the glass transition temperature of the polymer is about 20° C. The experiment results of the Comparative Example 3 show the copolymer having the significantly improved thermal resis-

EXAMPLE 2

The polymerization was performed in the same conditions and method as Example 1, except that the pressure of the ethylene is 35 bar, the reaction temperature is 70° C., the period of the reaction is 16 hours, and the mole ratio of the norbornene for MA is 0.5, and 0.22 mmol of AIBN were added to the reactor.

TABLE 5

|  | Temperature (° C.) | Time (h) | AIBN (mmol) | Toluene (ml) | MA (mmol) | Ethylene (bar) | Norbornene (mmol) | AlCl$_3$:MA (mole ratio) |
| --- | --- | --- | --- | --- | --- | --- | --- | --- |
| Example 1 | 65 | 20 | 0.27 | 20 | 18.7 | 30 | 37.4 | 1:2 |
| Example 2 | 70 | 16 | 0.22 | 20 | 44.42 | 35 | 44.42 | 1:2 |

TABLE 6

|  | yield (g) | Mw (g/mol) | Mw/Mn | Tg (° C.) | Td_50 (° C.) |
| --- | --- | --- | --- | --- | --- |
| Example 1 | 3 | 52300 | 2.3 | 115.6 | 457.6 |
| Example 2 | 2 | 859000 | 1.9 | 34.7 | 427.3 |

The experiment results of the Example 1 show the ethylene-methyl acrylate-norbornene alternative terpolymer having 115.6° C. of the glass transition temperature. As the amount of the ethylene increases, the glass transition temperature decreases. On the other hand, as the amount of the norbornene increases, the glass transition temperature increases. As a result, the polymers having a thermal resistance and properties desired may be synthesized by adjustment of the polymerization condition. The glass transition temperature of the ethylene-methyl acrylate alternative copolymer is, −16° C. as the Comparative Example 1, and the glass transition temperature of the methyl acrylate-norbornene alternative copolymer is 164.5° C. as the Comparative Example 3. Accordingly, it is possible to control in the both range.

The methyl(meth)acrylate, which can be produced to a polymer by itself, without comonomer, having the highest glass transition temperature in amongst the polymers from acrylate-based vinyl monomers is polymerized to the polymer having generally the glass transition temperature of 110° C. in the unicomponent polymerization, and the methyl acrylate is polymerized to the polymer having the glass transition temperature of 20° C. in the unicomponent polymerization. In order to overcome the problem in which the acrylate-based polymer can be easily broken, the ethylene is added to the acrylate-based polymer as comonomer, which has problem with decrease of the thennal resistance. However, since the glass transition temperature must be 100° C. or more in order to endure heat in process, the problem may be solved by adding the norbornene.

EXAMPLES 3~7

The polymerization was performed in the conditions and method as shown in the Table 7, using the various metal oxides capable of recycling as the Lewis acid. The polymerization was performed in the same conditions and method as Example 1, except that the metal oxide is additionally removed by filtering device after the polymerization. Results thereof are illustrated in Table 8.

TABLE 7

|  | Temperature (° C.) | Time (h) | AIBN/MA (mole ratio) | Toluene/MA (volume ratio) | Norbornene/MA (mole ratio) | Ethylene (bar) | Metallic oxide | Metallic oxide/MA (mole ratio) |
| --- | --- | --- | --- | --- | --- | --- | --- | --- |
| Example 3 | 70 | 6 | 0.0005 | 3 | 2 | 35 | Al$_2$O$_3$ | 1 |
| Example 4 | 70 | 6 | 0.001 | 4 | 2 | 35 | TiO$_2$ | 1 |
| Example 5 | 70 | 6 | 0.002 | 4 | 2 | 35 | B$_2$O$_3$ | 1 |
| Example 6 | 70 | 6 | 0.002 | 4 | 2 | 35 | CaTiO$_3$ | 1 |
| Example 7 | 70 | 6 | 0.002 | 4 | 2 | 35 | AlH$_3$O$_3$ | 1 |

TABLE 8

|  | MA amount (mol %) | Norbornene amount (mol %) | Ethylene amount (mol %) | Mw (g/mol) | Mw/Mn | Tg (° C.) | Transmittance (%) |
| --- | --- | --- | --- | --- | --- | --- | --- |
| Example 3 | 53 | 31 | 16 | 526000 | 2.3 | 124 | 89 |
| Example 4 | 65 | 21 | 14 | 317000 | 1.9 | 120 | 90 |
| Example 5 | 61 | 24 | 15 | 163000 | 1.6 | 111 | 89 |
| Example 6 | 53 | 40 | 7 | 131000 | 1.8 | 138 | 91 |
| Example 7 | 52 | 39 | 9 | 149000 | 2.1 | 131 | 91 |

It was found that the various metal oxides may be used as the Lewis acid. It was also found that the composition of polymers was different according to the property of the metal oxide (See e.g., FIG. 4 which illustrates a $^{13}$C-NMR spectrum of ethylene-methyl acrylate-2-norbornene terpolymer obtained according to Example 3), and the molecular weight increased according to the control of concentration of the initiator. The film produced using the polymers had 89% or more of the transmittance, and the thermal resistance of the optical film increased due to high Tg (see e.g., FIG. 3 which illustrates results of differential scanning calorimetry (DSC) of ethylene-methyl acrylate-2-norbornene terpolymer obtained according to Example 3).

INDUSTRIAL APPLICABILITY

In the method of preparing the alkene-acrylate-norbornene terpolymer of the present invention, the terpolymer may be prepared in a mild condition of low temperature and low pressure by using a Lewis acid or metal oxide so that the process is simple and the property of the terpolymer may be easily controlled. In addition, the terpolymers prepared by the method include the norbornene so that they have high glass transition temperature, and also include alkene, particularly ethylene so that they have high hygroscopic and complement brittle property of the acrylate-based resin. Accordingly, the property of the film is substantially improved.

The present invention can also be used in mild conditions, such as at a pressure of 200 bar or less and at a temperature of 100° C. or less, unlike the conventional technique that conditions of high temperature and high pressure is required. As a result, the process is simple and properties of the copolymer can be easily controlled. In addition, the metal oxide according to the present invention has an excellent moisture stability so that the resultant efficiency can be improved, and can be recycled without an additional treatment process.

In addition, when the metal oxide is used as Lewis acid, it can be easily recovered nearly 100% through only filtering device after polymerization and thus recycled. As a result, a cost of preparation can be lowered, and the metal oxide has an excellent moisture stability so that the resultant efficiency can be improved. In addition, an additional treatment process of remaining catalyst is not required so that the polymerization process can be simplified. Accordingly, the present invention can be largely applied in industrial scale.

The invention claimed is:

1. A method of preparing an alkene-acrylate-norbornene terpolymer comprising a step of polymerization of a monomer mixture consisting of alkene, acrylate and norbornene by a radical polymerization initiator in the presence of a metal oxide,
   wherein the metal oxide is a compound as represented in Formula 12, $$M_xN_yO_z \quad \text{Formula 12}$$

where
   M is at least one selected from the group consisting of alkali earth metals, transition metals, and group 13 and group 14 metals;
   N is group 5 or group 6 atom;
   O is oxygen atom;
   x, y and z are, respectively a value determined by state of oxidation of M and N,
   $x>0$, $y \geqq 0$ and $z>0$, and the amount of the radical initiator to the acrylate monomer is 0.01 to 1 mol %.

2. The method according to claim 1, wherein the amount of the acrylate monomer is 50 to 98 mol %, the amount of the alkene monomer is 1 to 50 mol %, and the amount of the norbornene monomer is 1 to 50 mol %.

3. The method according to claim 1, wherein the metal oxide can be at least one selected from the group of metal oxides consisting of $Al_2O_3$, $Y_2O_3$, $ZrO_2$, $HfO_2$, $SiO_2$, $B_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, $SnO$ and $TiO_2$; and complex metal oxides consisting of of $Dy_3Al_5O_{12}$, $Y_3Al_5O_{12}$, $Al_2O_3.TiO_2$, $3Al_2O_3.SiO_2$, $CaTiO_3$, $CaZrO_3$, $FeTiO_3$, $MgO.Al_2O_3$, $CeAl_{11}O_{18}$, $Al_2(SO_4)_3$, and $AlPO_4$.

4. The method according to claim 1, wherein the metal oxide is separated and refined after the polymerization reaction and is used in another polymerization reaction.

5. The method according to claim 1, wherein the amount of the metal oxide is 0.01 to 200 mol % based on the acrylate monomer.

6. The method according to claim 1, wherein the radical initiator is one species or a mixture of two or more species selected from the group consisting of peroxides and azo compounds.

7. The method according to claim 1, wherein the acrylate monomer is a compound as represented in Formula 1.

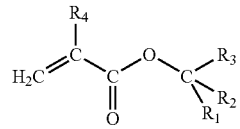

Formula 1 where
$R_1$, $R_2$ and $R_3$ are hydrogen atom, substituted or unsubstituted C1-C30 hydrocarbon group, or a mono-valent atomic group including a heteroatom, respectively and independently; and $R_4$ is hydrogen atom or methyl group.

8. The method according to claim 7, wherein the R1, $R_2$ and $R_3$ are, respectively and independently, hydrogen atom; substituted or unsubstituted C1-C6 alkyl group, substituted or unsubstituted C5-C12 aryl group, substituted or unsubstituted C6-C18 arylalkyl group, substituted or unsubstituted C5-C12 alkylaryl group, or substituted or unsubstituted C1-C6 alkoxy group; substituted or unsubstituted carbamoyl group; substituted or unsubstituted amino group; or substituted or unsubstituted silyl group.

9. The method according to claim 8, wherein the substituted group of one of the groups $R_1$ to $R_3$ is an amino group, C1-C6 alkoxy group, carbamoyl group or silyl group.

10. The method according to claim 1, wherein the acrylate monomer is selected from the group consisting of compounds and mixtures thereof as represented in Formulas 2 to 5

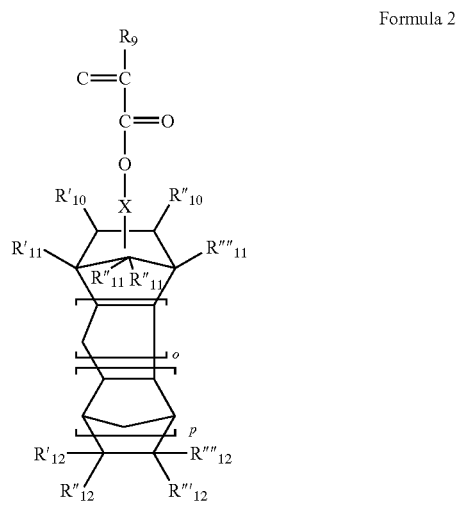

Formula 2

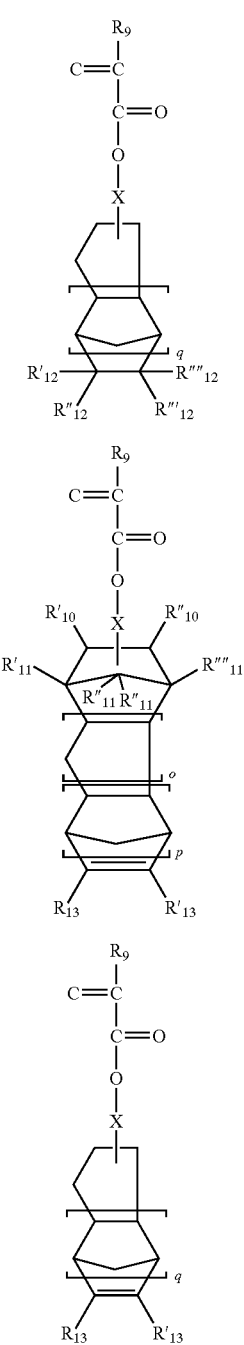

Formula 3

Formula 4

Formula 5 where, o, p and q are a positive number of 0 to 2 respectively and independently, x is just single bond, in profile of acryloyl, or a (II) connector of —($CH_2$)$_r$—, —($C_2H_4O$)$_r$—, —($C_3H_6O$)$_r$—, or —($C_4H_8$)$_r$— (r is a positive number of 0 to 5), $R_9$ is hydrogen or methyl group, $R'_{10}$ and $R''_{10}$ are hydrogen, $R'_{11}$, $R''_{11}$, $R'''_{11}$ and $R''''_{11}$ are hydrogen or methyl group (one among $R'_{10}$, $R''_{10}$, $R'_{11}$, $R''_{11}$, $R'''_{11}$ and $R''''_{11}$ is substituted with the x group), and $R'_{12}$, $R''_{12}$, $R'''_{12}$, $R''''_{12}$, $R_{13}$, and $R'_{13}$ are respectively, hydrogen; halogen; substituted or unsubstituted C1-C20 hydrocarbon group, bonding directly to a cyclic structure

or bonding via a connector including oxygen, nitrogen sulfur or silicon; or polar group.

11. The method according to claim 1, wherein the amount of the acrylate monomer used in the polymerization is 30 to 99 mol % based on the total amount of the monomer mixture.

12. The method according to claim 1, wherein the amount of the acrylate monomer used in the polymerization is 50 to 98 mol % based on the total amount of the monomer mixture.

13. The method according to claim 1, wherein the alkene is at least one selected from the group consisting of ethylene, propylene, 1-butene, 1-pentene, 1-hexene, 1-heptene, 1-octene, 1-nonene and 1-decene.

14. The method according to claim 1, wherein the norbornene is a compound as represented in Formula 6.

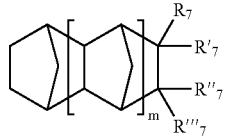

Formula 6 where m is a positive number of 0 to 4, $R_7$, $R'_7$, $R''_7$ and $R'''_7$ are a polar functional group or a nonpolar functional group, respectively and independently;

$R_7$, $R'_7$, $R''_7$ and $R'''_7$ form C4-C12 saturated or unsaturated cyclic group, or C6-C24 aromatic ring;

the nonpolar functional group is selected from the group consisting of hydrogen; halogen; a linear or branched C1-C20 alkyl, haloalkyl, alkenyl, or haloalkenyl; a linear or branched C3-C20 alkynyl, or haloalkynyl; alkyl-, alkenyl-, alkynyl-, halogen-, haloalkyl-, haloalkenyl-, or haloalkynyl-substituted or unsubstituted C3-C12 cycloalkyl; alkyl-, alkenyl-, alkynyl-, halogen-, haloalkyl-, haloalkenyl-, or haloalkynyl-substituted or unsubstituted C6-C40 aryl; and alkyl-, alkenyl-, alkynyl-, halogen-, haloalkyl-, haloalkenyl-, or haloalkynyl-substituted or unsubstituted C7-C15 aralkyl;

the polar functional group is selected from the group consisting of non-hydrocarbonaceous polar group including at least one oxygen, nitrogen, phosphorus, sulfur, silicon or boron, including, —$R^8OR^9$, —$OR^9$, —$OC(O)OR^9$, —$R^8OC(O)$ $OR^9$, —$C(O)R^9$, —$R^8C(O)R^9$, —$OC(O)R^9$, —$R^8C(O)$ $OR^9$, —$C(O)OR^9$, —$R^8OC(O)R^9$, —($R^8O$)$_k$—$R^9$, —($R^8O$)$_k$—$OR^9$, —$C(O)$—$O$—$C(O)R^9$, —$R^8C(O)$— $O$—$C(O)R^9$, —$SR^9$, —$R^8SR^9$, —$SSR^9$, —$R^8SSR^9$, —$S(=O)R^9$, —$R^8S(=O)R^9$, —$R^8C(=S)R^9$, —$R^8C$ $(=S)SR^9$, —$R^8SO_3R^9$, —$SO_3R^9$, —$R^8N=C=S$, —NCO, —$R^8$—NCO, —CN, —$R^8CN$, —NNC(=S) $R^9$, —$R^8NNC(=S)R^9$, —$NO_2$, —$R^8NO_2$,

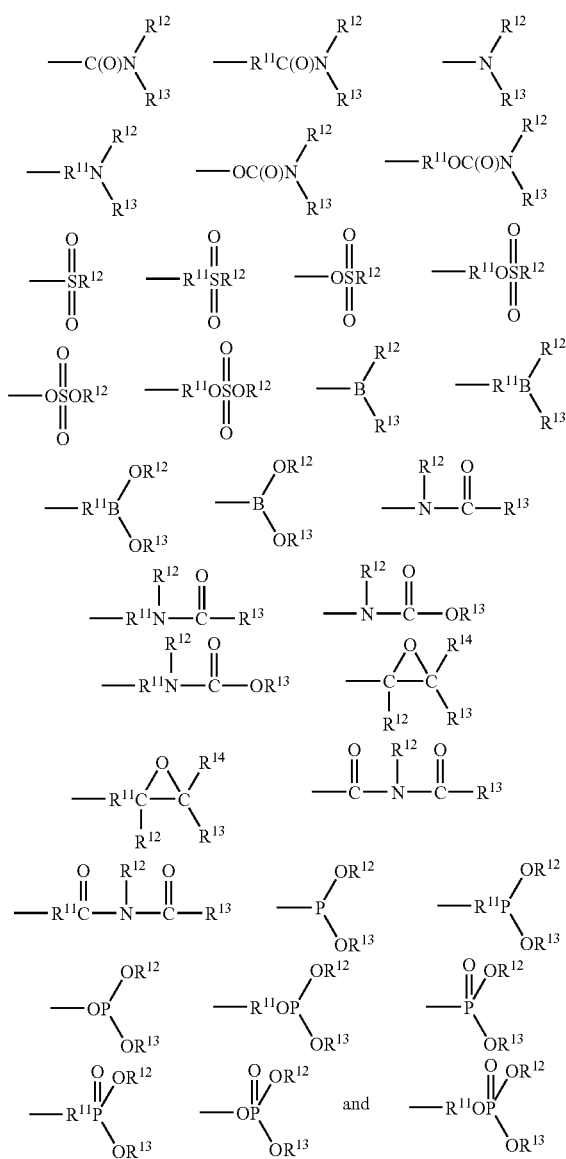

in the polar functional group, $R^8$ and $R^{11}$ are, respectively and independently, a linear or branched C1-C20 alkylene, haloalkylene, alkenylene, or haloalkenylene; a linear or branched C3-C20 alkynylene, and haloalkynylene; alkyl-, alkenyl-, alkynyl-, halogen-, haloalkyl-, haloalkenyl-, haloalkynyl-substituted or unsubstituted C3-C12 cycloalkylene; alkyl-, alkenyl-, alkynyl-, halogen-, haloalkyl-, haloalkenyl-, haloalkynyl-substituted or unsubstituted C6-C40 arylene; or alkyl-, alkenyl-, alkynyl-, halogen-, haloalkyl-, haloalkenyl-, haloalkynyl-substituted or unsubstituted C7-C15 aralkylene;

$R^9$, $R^{12}$, $R^{13}$ and $R^{14}$ are, respectively and independently, hydrogen; halogen; a linear or branched C1-C20 alkyl, haloalkyl, alkenyl, or haloalkenyl; a linear or branched C3-C20 alkynyl, or haloalkynyl; alkyl-, alkenyl-, alkynyl-, halogen-, haloalkyl-, haloalkenyl-, or haloalkynyl-substituted or unsubstituted C3-C12 cycloalkyl; alkyl-, alkenyl-, alkynyl-, halogen-, haloalkyl-, haloalkenyl-, or haloalkynyl-substituted or unsubstituted C6-C40 aryl; alkyl-, alkenyl-, alkynyl-, halogen-, haloalkyl-, haloalkenyl-, or haloalkynyl-substituted or unsubstituted C7-C 15 aralkyl; or alkoxy, haloalkoxy, carbonyloxy, halocarbonyloxy;

each of k is a positive number of 1 to 10.

15. The method according to claim 1, wherein the norbornene is at least one selected from the group consisting of norbornene, 5-ethylester-2-norbornene, t-butyl-5-norbornene-2-carboxylate(NB-TBE), methyl-5-norbornene-2-methyl-2-carboxylate(Nb-MMA), 5-methylene-2-norbornene, and 5-n-butyl-2-norbornene.

16. The method according to claim 1, wherein when the polymerization is carried out in the presence of a solvent, the solvent is at least one selected from the group consisting of toluene, chlorobenzene, n-hexane, tetrahydrofuran, chloroform, and methylene chloride.

17. The method according to claim 1, wherein the polymerization is carried out at a temperature in the range of 30 to 150° C.

18. The method according to claim 1, wherein the polymerization is carried out in the condition of 5 to 200 bar of pressure and 30 to 150° C. of temperature.

19. The method according to claim 1, wherein the polymerization is carried out in the condition of 20 to 50 bar of pressure and 40 to 80° C. of temperature.

20. The method according to claim 1, wherein the glass transition temperature of the terpolymer is in the range of 50 to 300° C.

21. The method according to claim 1, wherein the number average molecular weight of the terpolymer is in the range of 5,000 to 400,000, and the weight average molecular weight is in the range of 10,000 800,000.

22. The method according to claim 1, wherein the temperature, that 50% of the initial weight is decomposed, of the terpolymer is in the range of 300 500° C.

* * * * *